Aug. 13, 1940.  G. BUCHHOLTZ  2,211,557

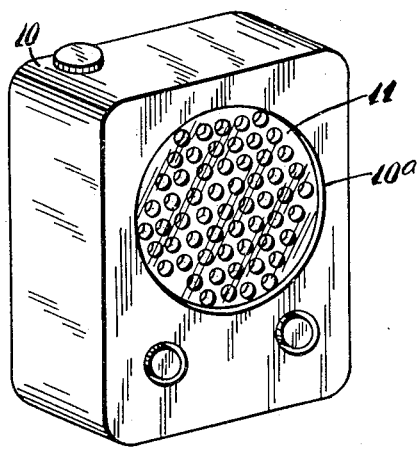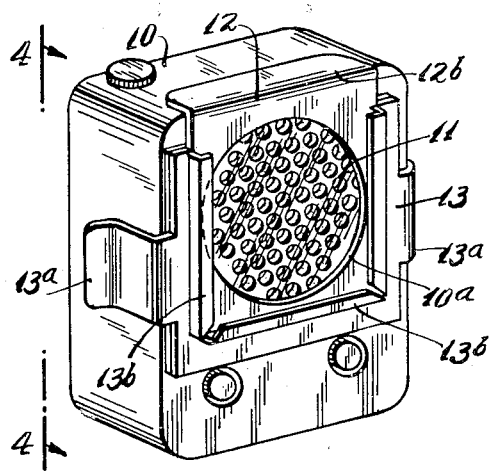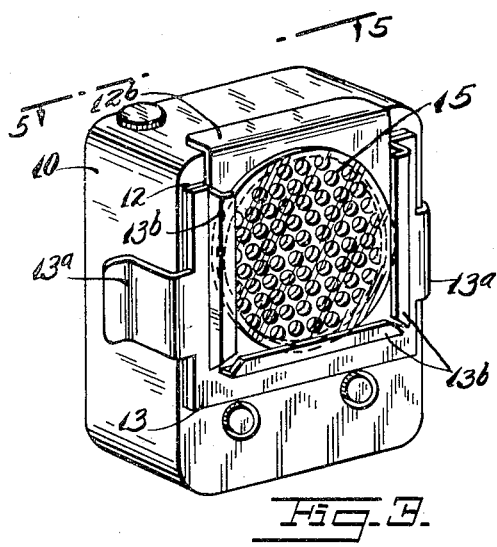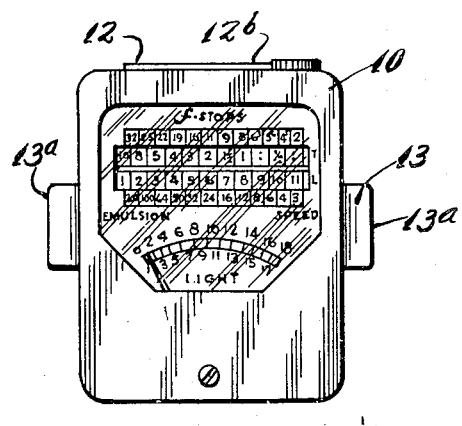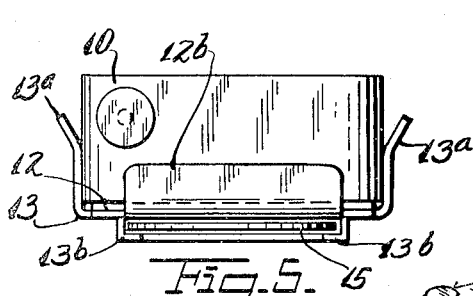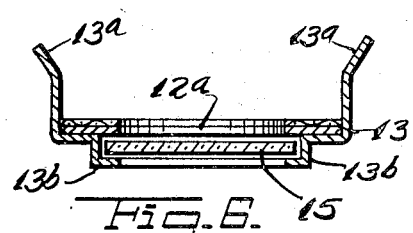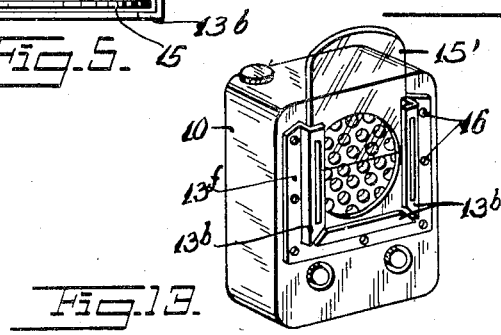

FILTER BRACKET FOR LIGHT METERS

Filed Jan. 21, 1939   2 Sheets-Sheet 2

INVENTOR
George Buchholtz
BY
ATTORNEY

Patented Aug. 13, 1940

2,211,557

UNITED STATES PATENT OFFICE 2,211,557

FILTER BRACKET FOR LIGHT METERS

George Buchholtz, Guttenberg, N. J.

Application January 21, 1939, Serial No. 252,126

1 Claim. (Cl. 95—81.5)

This invention relates to new and useful improvements in an automatic filter exposure meter.

More specifically, the invention proposes the construction of an automatic filter exposure meter characterized by the provision of a bracket for engagement upon a conventionally constructed light meter which is adapted to receive and hold a light filter over the light entrance element of the meter, the light filter being the same filter that is to be used in front of the lens of the camera when taking a picture for giving a reading taking into consideration the correction factor of said light filter.

Another object of this invention is the provision of clip portions formed on said bracket in a manner to be extended along the top and sides of said light meter for holding said bracket in position upon said meter.

Still further the invention proposes the provision of flange portions formed on said bracket for engaging the sides and bottom of said light filter to fixedly hold the same in position upon said bracket.

Another object of this invention is the provision of leaf springs stamped from certain of said flanges and which are adapted to engage the face of said light filter for forcing the same into face contact with said bracket.

Another object of this invention is the provision of a circular flange formed on said bracket and upon which a light shade to be used over the lens of said camera is adapted to be engaged for producing the same lighting conditions for taking the exposure reading as would be present in the camera at the time the film is exposed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the light meter to be used in conjunction with this invention.

Fig. 2 is a view similar to Fig. 1 and illustrating the bracket in position on the meter.

Fig. 3 is a view similar to Fig. 2 and illustrating the light filter in position upon the bracket.

Fig. 4 is a rear elevational view looking in the direction of the line 4—4 of Fig. 2.

Fig. 5 is a plan view looking in the direction of the line 5—5 of Fig. 3.

Fig. 6 is a horizontal sectional view of the bracket per se.

Fig. 13 is a similar view to Fig. 3, but illustrating another form of the invention.

Figure 7:
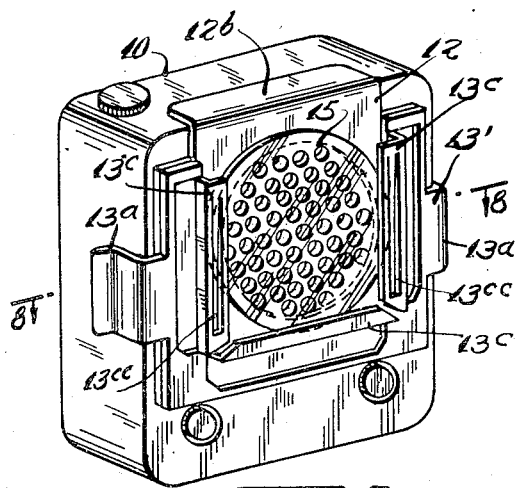
Fig. 7 is a view similar to Fig. 3 but illustrating a modification of the invention.
Figure 9:
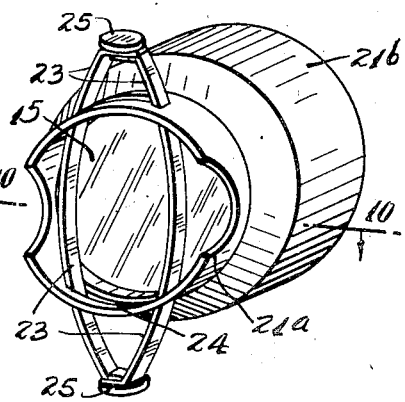
Fig. 9 is a perspective view of the light shade per se.

The automatic filter exposure meter, according to this invention, should be used in conjunction with a light meter 10 having a light entrance element 10$^a$ formed in one face thereof. The construction of the light meter 10 is conventional and the details thereof will not be given in this specification, except to say that the light entrance element 10$^a$ is in the form of an opening having a glass 11 extended thereacross and through which the light is adapted to pass for contacting the light sensitive elements of the light meter for giving the proper exposure readings for setting the stop and time exposures of a camera.

A bracket for supporting a light filter over the light entrance 10$^a$ of the exposure meter is adapted to receive and hold the same light filter which is adapted to be used in connection with the lens of the camera for giving an exposure reading taking into consideration the qualities of the filter to be used.

The bracket is constructed of seperate plates consisting of a back plate 12 and a front plate 13. The back plate 12 is formed with an opening 12$^a$ in alignment with the light entrance element 10$^a$ of the light meter 10. The back plate 12 is formed with a top rearwardly extending clip portion 12$^b$ for engaging the top of the light meter as shown in Figs. 2 and 3 for preventing the bracket from slipping down upon the face of the meter and disaligning the opening 12$^a$ with the light entrance element 10$^a$.

The adjacent faces of the plates 12 and 13 are secured together by welding, brazing or in any other desired manner. The sides of the front plate 13 are formed with rearwardly extending clip portions 13$^a$ which are bent around the sides of the rear plate 12 and which are adapted to engage the sides of the light meter 10 for preventing longitudinal movement of the bracket thereon and for maintaining the opening 12ª in alignment with the light entrance element of the meter 10. A felt sheet 14 is attached to the back face of the rear plate 12 and is normally disposed between the adjacent faces of the light meter 10 and the bracket for preventing the face of the light meter from being marred when the bracket is engaged thereon and for sealing the contacting faces of the meter and bracket for preventing light from entering there-through and interfering with the correct taking of an exposure reading.

The front plate 13 is formed with an enlarged square cutout, the edges 13ᵇ of which are bent into receiving flange portions for supporting a light filter 15. The receiving flange portions 13ᵇ are so arranged as to be capable of engaging the sides and bottom edge portions of the light filter 15 for holding the same in alignment with the opening 12ª formed in the rear plate 12.

The operation of this form of the invention is as follows:—

For taking an exposure reading which will take into consideration the density of the light filter to be used over the lens of the camera, the bracket is engaged on the face of the light meter 10 with the opening 12ª of the bracket aligned with the light entrance element 10ª of the meter. The light filter 15 which is to be used in connection with the lens of the camera is then engaged into the bracket by passing the same vertically downwards into the receiving flange portions 13ᵇ formed on the front plate 13. The light then passes through the light filter 15 contacting the light sensitive elements of the light meter for giving a reading which will take into consideration the filter 15.

After the reading has been taken and the camera has been properly set in accordance with the reading the light filter 15 is removed from the bracket and engaged into a conventional filter holder for holding the same in position in front of the lens of the camera.

Figure 8:
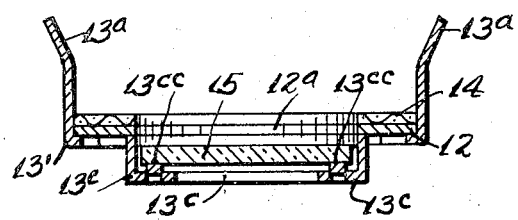
Fig. 8 is a horizontal sectional view taken on the line 8—8 of Fig. 7.

According to the modification of the invention shown in Figs. 7 and 8 the constructon of the bracket for supporting the light filter 15 is sim ilar to that previously described except that the receiving flange portions 13ᶜ are not bent from the edges of the front plate 13' as described in the previous form of the invention. Instead, the receiving flange portions 13ᶜ are formed by stamping lugs from the side and bottom portions of the front plate 13'. The lugs are then bent into the proper shape for receiving and holding the light filter 15 as shown in Fig. 7. A means is provided for forcing the light filter 15 in face contact with the adjacent faces of the rear plate 12. This means comprises vertical leaf springs stamped from the side receiving flange portions 13ᶜ and which bear against the outer face of the light filter 15. These leaf springs 13ᶜᶜ are stamped from the side receiving flange portions 13ᶜ in such a manner that the top ends thereof are integral with the flanges, while the bottom ends thereof are free for resiliently forcing the filter against the face of the plate 12 for preventing light from passing between the adjacent faces of these members.

According to the modification of the invention shown in Figs. 9–12 inclusive the construction of the bracket is such that the light shade used in connection with a camera 20 may also be engaged on the light meter 10 in alignment with the light entrance element 10ª for giving an exposure reading which takes into consideration the said light shade.

Figure 10:
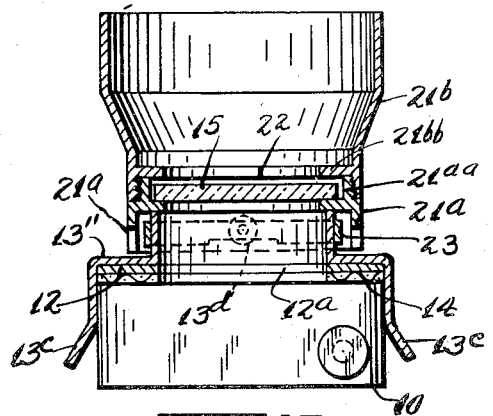
Fig. 10 is a horizontal sectional view taken on the line 10—10 of Fig. 9 and illustrating the light shade in position upon a bracket supported upon a light meter.
Figure 12:
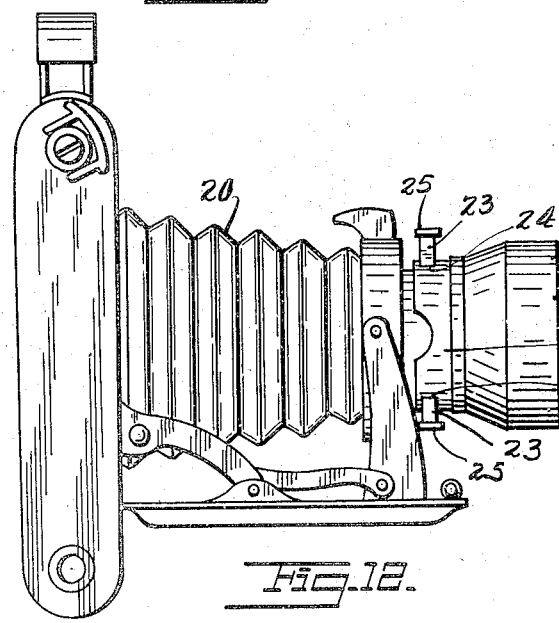
Fig. 12 is a side elevational view of the light shade in position upon a camera.
Figure 11:
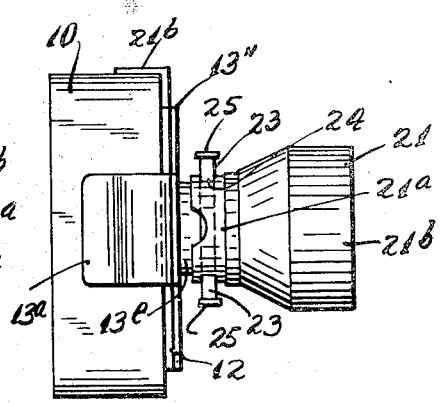
Fig. 11 is a side elevational view of the light shade in position upon the bracket.

In this form of the invention the bracket is engaged upon the light meter 10 and the front plate 13'' thereof is formed with a circular opening 13ᵈ which is in alignment with the opening 12ª formed in the rear plate 12. The material of the front plate 13'' around the edges of the opening 13ᵈ is extended forwards for forming a circular flange 13ᵉ upon which the light shade 21 is adapted to be engaged. The light shade 21 is constructed of separate sections consisting of a rear section 21ª which is adapted to be engaged upon the lens of the camera 20 or upon the flange 13ᵉ of the bracket. The light shade is further formed with a shade section 21ᵇ which is adapted to be threadedly engaged into the section 21ª as shown in Fig. 10.

The section 21ª is formed with an inwardly extending flange 21ᵃᵃ and the section 21ᵇ is formed with an inwardly extending flange 21ᵇᵇ. When the shade section 21ᵇ is in position upon the rear section 21ª the flanges 21ᵃᵃ and 21ᵇᵇ are normally spaced from each other for forming a space 22 into which a light filter 15 of the desired density is adapted to be placed.

A means is provided for holding the light shade 21 in position upon either the flange 13ᵉ of the bracket or the lens of the camera 20. This means comprises a pair of outwardly curved spring members 23 which have their ends passing through elongated slots 24 formed in the rear section 21ª of the light shade 21. The ends of the spring members 23 are securely attached together and are mounted upon finger engaging elements 25. In engaging the light shade on the flange 13ᵉ, as shown in Fig. 10, or upon the lens of the camera 20, one's fingers are rested upon the finger engaging elements 25 and the same are manually pressed together for causing the springs 23 to be urged apart to permit them to be engaged upon either the flange 13ᵉ or the lens of the camera 20. The finger engaging portions 25 are then released for permitting the springs 23 to snap back into position and tightly clamp the respective portion upon which the light shade is being engaged. It is also possible to use the light filter 15 without the shade section 21ᵇ by using a ring in place of the shade section 21ᵇ for holding the light filter in position upon the rear section 21ª. In other respects this form of the invention is similar to the other forms.

In Fig. 13 the light filter holding plate 15ᶠ is shown to be attached to one face of the meter 10 by screws 16 or the like, and edges 13ᵇ are adapted to receive a substantially rectangular light filter plate 15'. In other respects this form of the invention is similar to the previous forms.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A filter bracket for light meters and the like formed of sheet material and comprising a generally rectangular rear member stamped from flat sheet material, having a central light aperture and a rearwardly flanged upper edge portion for resting on the top of a light meter, and a generally U-shaped front member also stamped from sheet material and integrally secured to the front of said rear member, the inner edge portions of said front member forming L-shaped flanges surrounding three sides of said central light aperture whereby to provide a frame support for a filter, said front member having a side lug bent rearwardly from each vertical side edge portion thereof for gripping the sides of the light meter.

GEORGE BUCHHOLTZ.